United States Patent [19]

Sessions

[11] 3,990,723
[45] Nov. 9, 1976

[54] HYDRAULIC LIFT SYSTEM FOR GARDEN TRACTORS

[75] Inventor: Robert C. Sessions, Columbia, S.C.
[73] Assignee: Hart Kohn, Jr., Columbia, S.C.
[22] Filed: Apr. 14, 1975
[21] Appl. No.: 567,556

[52] U.S. Cl. .................. 280/490 A; 172/448; 172/469; 180/53 R
[51] Int. Cl.² ............................................ B60D 1/00
[58] Field of Search ........ 280/456 A, 490 R, 490 A, 280/479 R, 479 A, 460 A, 446 A, 405; 172/448, 449, 439, 469, 485, 487, 501, 503; 180/53 R, 53 C, 53 D

[56] References Cited
UNITED STATES PATENTS

| 718,640 | 1/1903 | Lathrop | 172/503 |
| 1,939,851 | 12/1933 | Horste | 180/53 R |
| 3,078,302 | 2/1963 | Foote | 260/485 |
| 3,124,201 | 3/1964 | Downing et al. | 172/485 X |
| 3,187,821 | 6/1965 | Kamlukin | 172/103 |
| 3,319,731 | 5/1967 | Kenkel | 180/53 |
| 3,483,938 | 12/1969 | Enters | 180/53 |
| 3,561,789 | 2/1971 | Stikeleather | 280/479 A |

Primary Examiner—Robert R. Song
Assistant Examiner—John A. Pekar
Attorney, Agent, or Firm—C. Gordon McBride

[57] ABSTRACT

A mechanism is provided for the positioning of an implement attached to a small garden tractor which includes a power takeoff system from the engine of the tractor connected to a device that controls a power drive mechanism attached to a positioning linkage that connects with the conventional manual lifting system for such tractors.

8 Claims, 3 Drawing Figures

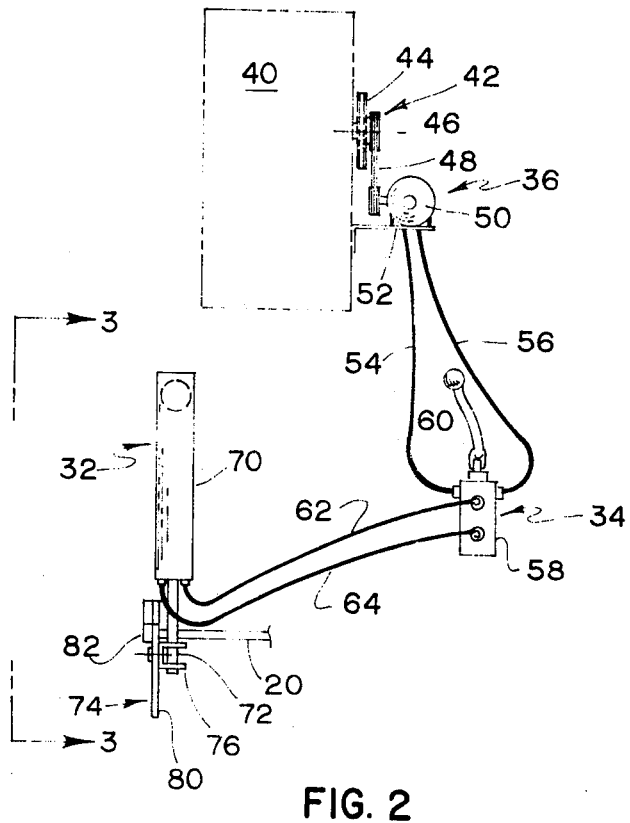
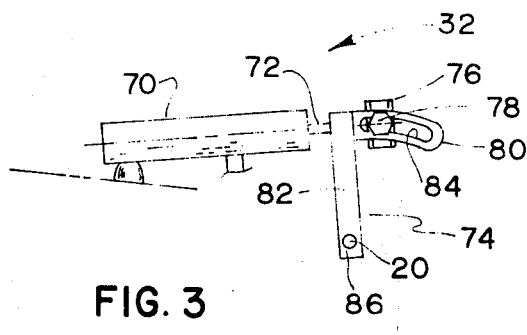

HYDRAULIC LIFT SYSTEM FOR GARDEN TRACTORS

This invention relates to positioning devices for farming implements, and more particularly to a hydraulic system adapted for attachment to garden tractors having low horsepower ratings.

In the past it has been known to utilize various systems for lifting farm implements attached to tractors. Generally these systems have been very cumbersome, required large horsepower and have only been adapted for use on extremely large tractors. These systems have been expensive, complicated and inapplicable to a small tractor which would generally be in the neighborhood of twelve horsepower. It has also been known to provide such small tractors with implements; however, the system for raising and lowering these mechanisms has been adapted only for manual operation. Furthermore, these systems fail to provide a positioning mechanism which will permit the implement to be held in one position.

The previously known lifting mechanisms for the small tractors have required manual force which in many instances cannot be accomplished by the operator due to some physical infirmity. Furthermore, because of the complicated nature of such prior power systems, it has been difficult to adapt them for the smaller garden tractors and when such has been accomplished it has necessarily been required that the systems be expensive and unacceptable to the purchaser of such tractors.

BRIEF DESCRIPTION OF PREFERRED EMBODIMENT

A conventional garden tractor is provided with a hydraulic pumping mechanism which is operated through the conventional pulley drive of the tractor engine and connected to a control device for properly positioning the implement by having the control device connected with a power mechanism attached to a linkage positioning apparatus wherein an arcuate slot in a slide bar is connected to a pivot bar attached to the conventional manual lifting mechanism for the implement.

DESCRIPTION

Referring now to the drawings wherein like numerals refer to the same or similar elements and wherein:

FIG. 2 is a schematic plan view of the instant invention; and,

FIG. 3 is a partial side elevational view taken on line 3—3 of FIG. 2.

Figure 1:
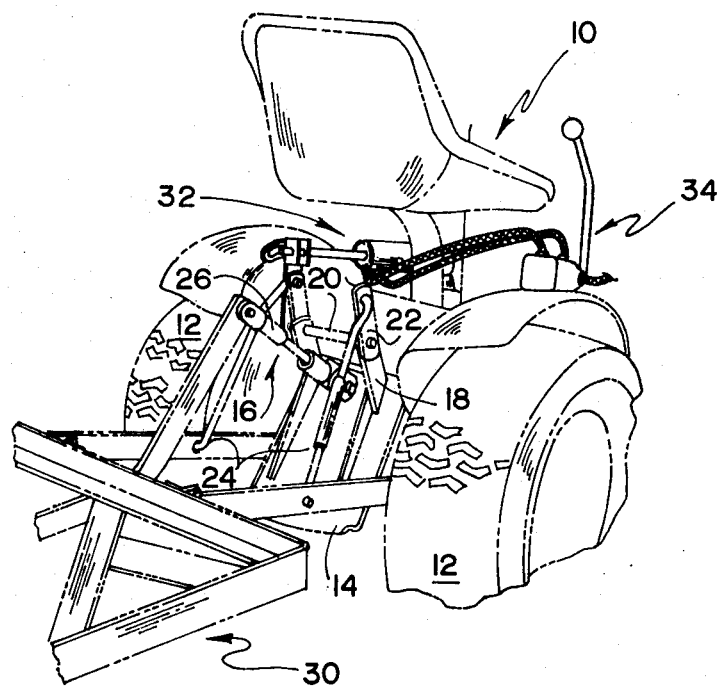
FIG. 1 is an overall view of a prior art device incorporating the instant invention.

Referring now to FIG. 1 wherein a conventional garden tractor having rear wheels 12 mounted on tractor frame 14 is shown to include a conventional hand or manual lifting mechanism 16.

Manual lifting mechanism 16 includes upright members 18 having a pivot rod 20 extending therebetween on which links 22 are mounted. Rods 24 connect links 22 with the apparatus for properly positioning implement 30. Rods 24 and linkage 26 are utilized with a manual control, such as a lifting rod for raising implement 30.

FIG. 2 shows the instant invention wherein power lift or positioning apparatus 32 is controlled by control mechanism 34 which is attached to the conventional hydraulic power motor and drive mechanism 36.

Tractor engine 40 includes conventional pulley drive 42 having pulleys 44 thereon for operation of the conventional apparatus associated with a garden tractor and the engine therefor. In accordance with the instant invention conventional pulley drive 42 is modified to receive an additional pulley 46 which is attached by belt 48 to a conventional hydraulic pump 50. Pump 50 is a hydraulic pump such as used for the power steering mechanism of an automobile. Pump 50 is mounted in the vicinity of pulley drive 42 on bracket 52. Power hose 54 connects hydraulic pump 50 with control device 58 and return hose 56 returns fluid from control device 34 to pump 50.

Control device 58 is of conventional design including the appropriate valving for transfer of hydraulic pressure from control device 58 to power lift and positioning mechanism 32 upon the appropriate positioning command of control lever 60.

Control device 34 is connected with the power lift and positioning means 32 by a pressure hose 62 and a return or reverse hose 64. The power lift mechanism 32 is comprised of a conventional hydraulic cylinder 70 in which is mounted a piston, not shown, attached to piston rod 72. This construction permits the pressure of the fluid in hose 62 to effect movement of piston rod 72 in one direction whereas pressure in hose 64 effect movement of piston rod 72 in the reverse direction.

Piston rod 72 is a part of the power positioning mechanism comprised of hydraulic cylinder 70 and piston rod 72. The moveable piston rod 72 is connected with the positioning linkage apparatus 74 by fork bracket 76.

Bracket 76 is attached to a cam link or slide bar 80 by bolt 78. Slide bar 80 is arcuate and has arcuate slot 84 therein for receiving bolt 78 to provide an adjustment to insure the proper positioning of the lifting apparatus to coordinate such with implement 30 to be attached to the tractor.

Cam link or slide bar 80 has pivot arm or bar 82 rigidly affixed thereto at the end nearest hydraulic cylinder 70. Pivot bar 82 extends downwardly from slide bar 80 and has aperture or opening 86 for fixed attachment to pivot rod 20 as by welding. It is also contemplated that a bracket, not shown, may be rigidly attached to pivot bar 82 about opening 86 in order that pivot rod 20 may be attached thereto as by set screws.

Thus it is seen that by having the power drive mechanism 36 attached to engine 40 through pulley drive 42 hydraulic power can be directed from pump 50 to control mechanism 34 where command lever 60 may be appropriately set for raising, lowering, or holding stationary implement 30. Control device 58 permits the hydraulic fluid entering through hoses 54 and 56 to provide power to be transferred through hoses 62 and 64 to hydraulic cylinder 70 to provide power to the power lift and positioning mechanism 32. Movement of piston rod 72 rearward effects a clockwise rotation of slide bar 80 and clockwise rotation of pivot bar 82, as seen in FIG. 3, and, therefore, a similar rotation of pivot rod 20 which effects lowering of implement 30. A withdrawing of piston rod 72 into cylinder 70, as seen in FIG. 3, causes a counterclockwise movement of slide bar 80 and a related motion of pivot bar 82 and pivot rod 20 to thereby effect a raising of implement 30.

A preferred embodiment of the invention is described hereinabove. However, it is to be understood that other power devices may be utilized within the scope of the concept. An electrical-hydraulic pump which is connected to a source of electrical power, such as the tractor battery, may operate hydraulic cylinder 70. In such instance operation of the pump in one direction would cause piston rod 72 to be extended from cylinder 70 and thereby effect movement of positioning mechanism 32 to lower implement 30.

Similarly, an electro-mechanical system may be utilized in which an electric motor is provided with gears. Such gears are connected to a rod or lever which is attached to bracket 76. Thus, movement of the motor shaft and gears in one direction causes positioning mechanism 32 to lower implement 30 and movement of the gears in the reverse direction raises implement 30.

Thus, because of the positioning linkage apparatus 74, it is possible to utilize any of several power systems for movement of an implement attached to a small garden tractor. The unique arrangement and design of bracket 76, slide link 80 and pivot bar 82 permit the equiping of small tractors with a power system for implements attached thereto.

It is readily seen that by proper positioning of command lever 60, slide bar 80 and pivot bar 82 may be held in a desired position with implement 30 lowered, raised or at any desired level. It is also to be understood that by lowering implement 30 and releasing the pressure on cylinder 70, implement 30 may be permitted to ride freely by reason of slide bar 80 upon the surface or at a given depth as for a plow which would permit the plow to raise of its own accord should some obstruction be encountered.

Thus, it is seen the instant invention provides an economical and easily installed mechanism to provide a power system for raising, lowering, or positioning an implement on a conventional, small, garden tractor. The inexpensive nature and easy installation provide a desirable apparatus for attachment to a garden tractor and permit the operation thereof in all its capabilities by even a physically handicapped individual.

What is claimed is:

1. A mechanism for controlling implements attached to a garden tractor having a manual linkage apparatus including an implement lifting mechanism and a pivot rod for actuating said implement lifting mechanism mounted on the rear of the tractor; said mechanism comprising:
    means for providing power;
    control means connected to said power means for positioning of the implement lifting mechanism;
    power positioning means for effecting movement and positioning of a positioning linkage means connected to said control means and attached to said positioning linkage means; and
    said positioning linkage means including a bracket attached to said power positioning means; a slide bar adjustably connected to said bracket to permit proper positioning of the implement lifting mechanism; a pivot bar affixed to one end of said slide bar; one end of said pivot bar attached to said pivot rod.

2. The mechanism of claim 1 including said slide bar having an arcuate slot therein.

3. The mechanism of claim 1 wherein said pivot bar extends downwardly from said slide bar.

4. The mechanism of claim 1 wherein said power means comprises a hydraulic pump connected to the engine of the tractor by a belt and pulley apparatus; and power and return hoses connecting said power means and said control means.

5. The mechanism of claim 1 wherein said power positioning means comprises a hydraulic cylinder having a piston rod; and said power positioning means connected to said control by pressure and reverse hoses.

6. The mechanism of claim 1 wherein said slide bar includes an arcuate slot; and said pivot bar extending downwardly from said slide bar at the end thereof nearest said power positioning means.

7. The mechanism of claim 1 wherein said slide bar includes an arcuate slot; said pivot bar extending downwardly from said slide bar at the end thereof nearest said power positioning means; said power positioning means including a hydraulic cylinder having a piston rod; and said hydraulic cylinder connected to said control means by pressure and reverse hoses.

8. A mechanism for raising and lowering an implement attached to a garden tractor having a manual linkage apparatus including an implement lifting mechanism and a pivot rod for actuating said implement lifting mechanism mounted on the rear of the tractor, said mechanism comprising:
    power takeoff means having a belt connecting the engine pulley drive of the tractor to a hydraulic pump mounted near said engine;
    control means connected to said pump by power and return hoses and having a control device with a command means for establishing movement of the implement lifting mechanism;
    power positioning means for effecting movement and positioning of a positioning linkage means connected to said control means by pressure and reverse hoses; said power positioning means including a hydraulic cylinder having a movable piston rod and attached to said positioning linkage means; and,
    said positioning linkage means connected to the pivot rod of the manual linkage apparatus; said positioning linkage means including a fork bracket attached to said piston rod; a slide bar having an arcuate slot connected to said fork bracket by a bolt extending through said slot for movement along said slot for adjustment of said positioning linkage means; a pivot bar rigidly affixed to the end of said slide bar nearest said cylinder and extending downwardly therefrom; the end of said pivot bar opposite to that affixed to said slide bar having an opening for permitting attachment to said pivot rod.

* * * * *